United States Patent
Yagi et al.

(10) Patent No.: US 8,268,898 B2
(45) Date of Patent: Sep. 18, 2012

(54) PRODUCTION METHOD OF LIQUID HYDROCARBONS FROM NATURAL GAS

(75) Inventors: Fuyuki Yagi, Yokohama (JP); Kenichi Kawazuishi, Yokohama (JP)

(73) Assignees: Japan Oil, Gas and Metals National Corporation, Kawasaki-shi (JP); Inpex Corporation, Tokyo (JP); JX Nippon Oil & Energy Corporation, Tokyo (JP); Japan Petroleum Exploration Co., Ltd., Tokyo (JP); Cosmo Oil Co., Ltd., Tokyo (JP); Nippon Steel Engineering Co., Ltd., Tokyo (JP); Chiyoda Corporation, Yokohama-shi (JP)

( * ) Notice: Subject to any disclaimer, the term of this patent is extended or adjusted under 35 U.S.C. 154(b) by 177 days.

(21) Appl. No.: 12/920,751

(22) PCT Filed: Mar. 11, 2009

(86) PCT No.: PCT/JP2009/055217
§ 371 (c)(1),
(2), (4) Date: Sep. 2, 2010

(87) PCT Pub. No.: WO2009/113714
PCT Pub. Date: Sep. 17, 2009

(65) Prior Publication Data
US 2011/0003900 A1  Jan. 6, 2011

(30) Foreign Application Priority Data

Mar. 14, 2008 (JP) ................. 2008-065465

(51) Int. Cl.
*C07C 27/00* (2006.01)
(52) U.S. Cl. .............. 518/700; 518/704; 518/705

(58) Field of Classification Search ........... 518/700–705
See application file for complete search history.

(56) References Cited

U.S. PATENT DOCUMENTS
4,296,085 A 10/1981 Banquy
(Continued)

FOREIGN PATENT DOCUMENTS
JP  03-242302 A  10/1991
(Continued)

OTHER PUBLICATIONS

Notification of Transmittal of Translation of the International Preliminary Report on Patentability (Form PCT/IB/338) of International Application No. PCT/JP2009/055217 mailed Nov. 11, 2010 with Forms PCT/IB/373, PCT/ISA/237, and PCT/IB/326.

(Continued)

Primary Examiner — Jafar Parsa
(74) Attorney, Agent, or Firm — Westerman, Hattori, Daniels & Adrian, LLP

(57) ABSTRACT

In a so-called GTL process of producing synthesis gas from natural gas, producing Fischer-Tropsch oil by way of Fischer-Tropsch synthesis of the obtained synthesis gas and producing liquid hydrocarbons containing fuel oil by upgrading, the synthesis gas produced from the synthesis gas production step is partly branched off prior to getting to the Fischer-Tropsch oil production step and the synthesis gas entering the branch line is subjected to a water gas shift reaction to raise the hydrogen concentration thereof. Subsequently, high-purity hydrogen is isolated from the synthesis gas and the residual gas left after the isolation is circulated to the synthesis gas production step and used as raw material for synthesis gas production. As a result, a significant improvement can be achieved in terms of raw material consumption per product of the entire process.

10 Claims, 2 Drawing Sheets

U.S. PATENT DOCUMENTS

| | | | |
|---|---|---|---|
| 6,147,126 | A | 11/2000 | DeGeorge et al. |
| 6,495,610 | B1 | 12/2002 | Brown |
| 2002/0016375 | A1 | 2/2002 | Iijima et al. |
| 2004/0242707 | A1 | 12/2004 | De Graaf et al. |
| 2006/0106119 | A1 | 5/2006 | Guo et al. |

FOREIGN PATENT DOCUMENTS

| | | |
|---|---|---|
| JP | 2001-342003 A | 12/2001 |
| JP | 2002-502833 A | 1/2002 |
| WO | 87/02347 A1 | 4/1987 |
| WO | 99/40048 A1 | 8/1999 |
| WO | 2004/088225 A2 | 10/2004 |
| WO | 2007/114274 A1 | 10/2007 |

OTHER PUBLICATIONS

Canadian Office Action dated Dec. 8, 2011, issued in corresponding Canadian Patent Application No. 2,718,506.

International Search Report of PCT/JP2009/055217, mailing date Jun. 2, 2009.

Extended European Search Report dated Jun. 13, 2012, issued in corresponding application No. 09719518.4.

PRODUCTION METHOD OF LIQUID HYDROCARBONS FROM NATURAL GAS

TECHNICAL FIELD

This invention relates to a so-called GTL process for producing liquid hydrocarbons that contain fuel oil from natural gas.

BACKGROUND ART

A so-called GTL process for producing liquid hydrocarbons that contain fuel oil from natural gas is described, for example, in WO 2007/114274 A1. FIG. 2 of the accompanying drawings is a schematic illustration of the flow of such a known GTL process.

The GTL process illustrated in FIG. 2 includes a hydrodesulfurization step 120 of hydrodesulfurizing sulfur compounds in natural gas, a synthesis gas production step 130 of producing synthesis gas by way of a reforming reaction of natural gas and steam and/or carbon dioxide, a carbon dioxide removal step 140, which is provided whenever necessary, a Fischer-Tropsch oil production step 150 of producing Fischer-Tropsch (FT) oil from the synthesis gas by way of Fischer-Tropsch (FT) synthesis, an upgrading reaction step 160 of hydrogenating the produced Fischer-Tropsch oil and an upgrading gas/liquid separation step 170 of subjecting the hydrogenated product obtained by the upgrading reaction step to gas/liquid separation to obtain liquid hydrocarbons, the above steps being arranged sequentially from the natural gas feed side (or the upstream side) or from the left side in FIG. 2.

The synthesis gas produced from the synthesis gas production step 130 partly branches off at a stage prior to getting to the Fischer-Tropsch oil production step 150 to form a branch line 145 as shown in FIG. 2 and the synthesis gas in the branch line 145 is separated into high-purity hydrogen (line 192) and off gas (line 191) in a hydrogen separation step 190 typically by means of a hydrogen PSA (pressure swing adsorption) method. The separated high-purity hydrogen joins hydrogen circulation line 177, by way of lines 192 and 197, where hydrogen circulates from the upgrading gas/liquid separation step 170 to the upgrading reaction step 160. On the other hand, the off gas that is purged from the line 191 is normally consumed as fuel.

Since the off gas 191 discharged from the hydrogen separation step 190 contains unreacted methane, a significant improvement can be achieved in terms of raw material consumption per product to an economic advantage if it can be taken into the process once again and reutilized as raw material. However, there is not any technique proposed to date to realize a process for treating such off gas.

DISCLOSURE OF THE INVENTION

In view of the above-identified circumstances, the object of the present invention is to provide a method of taking the off gas discharged from the hydrogen separation step in a GTL process for producing liquid hydrocarbons from natural gas back into the process once again so as to reutilize it as raw material and improve raw material consumption per product.

According to the present invention, the above object is achieved by providing a production method of liquid hydrocarbons from natural gas including: a hydrodesulfurization step of removing sulfur compounds in natural gas by hydrodesulfurization; a synthesis gas production step of producing synthesis gas by way of a reforming reaction of the natural gas after hydrodesulfurization with steam and/or carbon dioxide; a Fischer-Tropsch oil production step of producing Fischer-Tropsch (FT) oil from the synthesis gas by subjecting the synthesis gas produced from the synthesis gas production step to a Fischer-Tropsch (FT) reaction; an upgrading reaction step of hydrogenating the Fischer-Tropsch oil produced from the Fischer-Tropsch oil production step; an upgrading gas/liquid separation step of subjecting the hydrogenated product obtained by the upgrading reaction step to gas/liquid separation to obtain liquid hydrocarbons; a shift step of partly branching the synthesis gas produced from the synthesis gas production step to form a branch line at a stage prior to getting to the Fischer-Tropsch oil production step and raising the hydrogen concentration by subjecting the synthesis gas into the branch line to a water gas shift reaction; and a hydrogen separation step of separating the high-purity hydrogen from the outlet gas of the shift step and also isolating the consequently produced residual gas, wherein the residual gas (off gas) separated in the hydrogen separation step is circulated to the synthesis gas production step in order to use it as raw material for synthesis gas production.

Preferably, in a method of producing liquid hydrocarbons from natural gas as defined above, the residual gas (off gas) separated in the hydrogen separation step is so arranged as to contain methane and carbon dioxide as main components.

Preferably, in a method of producing liquid hydrocarbons from natural gas as defined above, the high-purity hydrogen gas separated in the hydrogen separation step is supplied to the hydrodesulfurization step and the upgrading reaction step.

Preferably, in a method of producing liquid hydrocarbons from natural gas as defined above, steam and/or carbon dioxide are added at a ratio of $H_2O/C=0.0$ to 3.0 and/or at a ratio of $CO_2/C=0.0$ to 1.0, where $H_2O$ and $CO_2$ represent the number of $H_2O$ molecules and the number of $CO_2$ molecules respectively and C represents the number of carbon atoms in hydrocarbons originating from the mixture material of natural gas and hydrocarbons being circulated for use.

Preferably, in a method of producing liquid hydrocarbons from natural gas as defined above, the synthesis gas production step is so arranged that the outlet temperature and the outlet pressure of the catalyst bed are respectively 800 to 950° C. and 1.5 to 3.0 MPaG and the gas hourly space velocity (GHSV) is 500 to 5,000 $hr^{-1}$.

Preferably, in a method of producing liquid hydrocarbons from natural gas as defined above, the synthesis gas production step is so arranged that the natural gas supplied as raw material contains hydrocarbons having 1 to 6 carbon atoms, which include methane as a main component.

Thus, according to the present invention, there is provided a shift step of partly branching the synthesis gas produced from the synthesis gas production step to form a branch line at a stage prior to getting to the Fischer-Tropsch oil production step and raising the hydrogen concentration by subjecting the synthesis gas into the branch line to a water gas shift reaction. Then, the residual gas (off gas) separated in the hydrogen separation step that follows the shift step is circulated to the synthesis gas production step in order to use it as raw material for synthesis gas production. Therefore, a significant improvement can be achieved in terms of raw material consumption per product by taking the off gas coming from the hydrogen separation step that used to be consumed as fuel into the process once again and reusing it as raw material.

Additionally, since the hydrogen separation step is arranged after subjecting the synthesis gas that gets into the branch line to a shift reaction, the present invention provides an advantage that the load of the hydrogen separation step is reduced as a result of an improved hydrogen purity and that the carbon dioxide that is separated and concentrated can be reused as raw material for carbon dioxide reforming.

BEST MODE FOR CARRYING OUT THE INVENTION

Now, the present invention will be described in greater detail by way of an embodiment.

Figure 1:
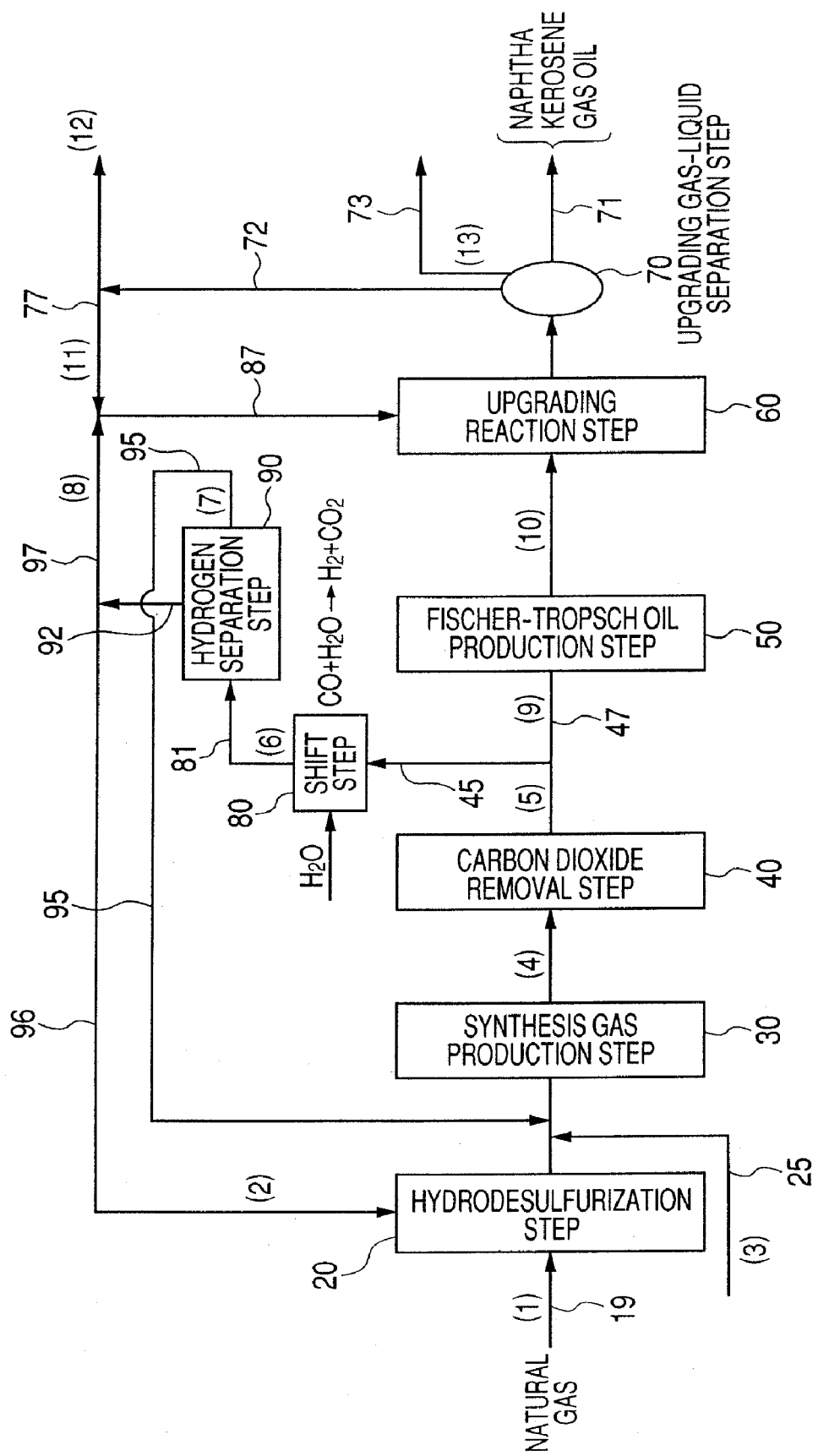
FIG. 1 is a flowchart of the process of producing liquid hydrocarbons from natural gas according to the present invention.

FIG. 1 is a flowchart of the process of producing liquid hydrocarbons from natural gas according to the present invention.

A method of producing liquid hydrocarbons from natural gas according to the present invention basically includes a hydrodesulfurization step 20 of removing sulfur compounds in natural gas by hydrodesulfurization, a synthesis gas production step 30 of producing synthesis gas by way of a reforming reaction of natural gas with steam and/or carbon dioxide, a carbon dioxide removal step 40, which is provided whenever necessary, a Fischer-Tropsch oil production step 50 of producing Fischer-Tropsch (FT) oil from the synthesis gas by subjecting the synthesis gas to a Fischer-Tropsch (FT) reaction, an upgrading reaction step 60 of hydrogenating the Fischer-Tropsch oil produced from the Fischer-Tropsch oil production step, and an upgrading gas/liquid separation step 70 of subjecting the obtained hydrogenated product to gas/liquid separation to produce liquid hydrocarbons, the above steps being arranged sequentially from the natural gas feed side (the line 19 side) or from the left side in FIG. 1.

While the upgrading reaction step 60 and the upgrading gas/liquid separation step 70 are shown as separate steps in FIG. 1, they may be combined to a single step that is not divided into two separate steps. Then, the step is simply referred to as "upgrading step".

As shown in FIG. 1, the synthesis gas produced from the synthesis gas production step 30 is subjected, if necessary, to a carbon dioxide removal step 40 and subsequently partly branched off to a branch line 45 and the synthesis gas branched to the branch line 45 is introduced into the hydrogen separation step 90 by way of the shift step 80.

In the shift step 80, the hydrogen concentration of the synthesis gas is raised by subjecting the synthesis gas to a water gas shift reaction. In the hydrogen separation step 90, the high-purity hydrogen is isolated so that the residual gas that is produced at the same time is consequently isolated. The high concentration hydrogen produced from the hydrogen separation step 90 is supplied to the upgrading reaction step 60 from line 92 and by way of lines 97 and 87 and also to the hydrodesulfurization step 20 by way of line 92 and line 96. On the other hand, the residual gas (off gas) isolated in the hydrogen separation step 90 is circulated to the synthesis gas production step 30 by way of line 95 so as to be reused as raw material.

The process of producing liquid hydrocarbons from natural gas according to the invention as illustrated in FIG. 1 is characterized in that the synthesis gas produced from the synthesis gas production step 30 is partly branched off at a stage prior to getting to the Fischer-Tropsch oil production step 50 to a branch line 45 and a shift step 80 is provided so as to subject the synthesis gas branched off to the branch line 45 to a water gas shift reaction in order to raise the hydrogen concentration prior to introducing it into the hydrogen separation step 90 and the high-purity hydrogen and the residual gas are separated from each other, the residual gas (off gas) being circulated to the synthesis gas production step 30 by way of line 95 and reutilized as raw material for synthesis gas production.

Now, each of the steps of the process of producing liquid hydrocarbons from natural gas will be described in detail below.

A. Hydrodesulfurization Step 20

The hydrodesulfurization step indicated by reference symbol 20 in FIG. 1 is a step of hydrodesulfurizing the sulfur compounds that are contained in the natural gas fed from line 19 as raw material.

The high-purity hydrogen produced from the hydrogen separation step 90 is supplied as hydrogen for the hydrodesulfurization by way of lines 92 and 96.

B. Synthesis Gas Production Step

The synthesis gas production step 30 is a step of producing synthesis gas (CO and $H_2$) by way of a reforming reaction of the natural gas supplied as raw material with steam and/or carbon dioxide. In other words, it is a step of producing synthesis gas containing CO and $H_2$ as main components by reforming with steam ($H_2O$) and/or carbon dioxide ($CO_2$) in the presence of a synthesis gas production catalyst, using raw material gas that contains methane as main component.

Steam ($H_2O$) and/or carbon dioxide ($CO_2$) are supplied from line 25. When the natural gas that is supplied as raw material contains carbon dioxide ($CO_2$) in advance, only steam ($H_2O$) may be supplied from line 25.

What is important according to the present invention is that the residual gas isolated in the hydrogen separating step 90 is circulated (recycled) as raw material for producing synthesis gas by way of line 95 in addition to the natural gas supplied as raw material in the synthesis gas production step 30.

For the synthesis gas production step 30, steam and/or carbon dioxide that are added are so adjusted that they are added at a ratio of $H_2O/C=0.0$ to 3.0 and/or at a ratio of $CO_2/C=0.0$ to 1.0, where $H_2O$ and $CO_2$ represent the number of $H_2O$ molecules and the number of $CO_2$ molecules respectively and C represents the number of carbon atoms in hydrocarbons originating from the mixture material of natural gas and hydrocarbons being circulated for use by way of line 95.

The ratio of $H_2O/C$ is preferably within a range between 0.3 and 1.7 and more preferably within a range between 0.7 and 1.3. On the other hand, the ratio of $CO_2/C$ is preferably within a range between 0.2 and 0.8 and more preferably within a range between 0.4 and 0.6.

In the synthesis gas production step 30, normally the outlet temperature of the catalyst bed is preferably between 800 and 950° C. and more preferably between 850 and 920° C., while the outlet pressure of the catalyst bed is preferably between 1.5 and 3.0 MPaG. The gas hourly space velocity (GHSV) is preferably between 500 and 5,000 $hr^{-1}$.

B1. Catalyst For Synthesis Gas Production

The catalyst for producing synthesis gas has a carrier that acts as base material and catalyst metal carried by the carrier.

A molded body of calcined magnesium oxide is preferably used as carrier. Such a molded body is formed by molding magnesium oxide powder under pressure into a predetermined profile and subsequently calcining the molded body. While the molded body may take any shape without limitations, it preferably shows a profile suited as industrial catalyst such as ring-shaped or saddle-shaped, as a multi-hole body or as pellets, although it may take an irregular shape like a broken object.

The molded body of magnesium oxide that acts as carrier preferably has a specific surface area of 0.1 to 1.0 m$^2$/g, more preferably 0.2 to 0.5 m$^2$/g, as observed by means of the BET method. When the specific surface area exceeds 1.0 m$^2$/g, there is a tendency to increase the rate of formation of carbon and to cause a disadvantage that the catalytic activity is reduced. When the specific surface area is less than 0.1 m$^2$/g, there is a tendency that the catalytic activity per unit catalyst is so small that a large amount of the catalyst must be disadvantageously used. Generally, the specific surface area of the carrier to be obtained can be controlled by adjusting the calcining temperature and the calcining time.

Magnesium oxide (MgO) used as a carrier may be obtained by calcining commercially available magnesium oxide (MgO). The purity of magnesium oxide (MgO) is required to be not less than 98 wt %, preferably not less than 99 wt %. Contamination of components enhancing the carbon deposition activity or components decomposing under a high temperature or a reducing gas atmosphere, such as iron, nickel and the like metals and silicon dioxide (SiO2), is particularly undesirable.

Ruthenium (Ru) that acts as catalyst metal is carried by the carrier within a range between 10 and 5,000 wt-ppm, preferably between 100 and 2,000 wt-ppm, in terms of metal equivalent (the weight ratio relative to the catalyst carrier). An amount of Ru above 5,000 wt-ppm is undesirable because the cost of catalyst increases and because carbon deposition tends to occur during production. Too small an amount of Ru below 10 wt-ppm fails to provide satisfactory catalytic activity.

Ruthenium (Ru) may be replaced by rhodium (Rh) for the purpose of the present invention.

A method of preparing a synthesis gas production catalyst will be described below as an example.

(1) Formation of Catalyst Carrier

Powdery magnesium oxide (MgO) is mixed with a lubricant, which may typically be carbon, and molded to show a predetermined profile under pressure. Subsequently, the molded product is calcined at temperature not lower than 1,000° C., preferably between 1,150 and 1,300° C., more preferably between 1,150 and 1,250° C. for one to four hours normally in the atmosphere.

While the activity of an ordinary reforming catalyst depends on the type of the catalyst, it is substantially proportional to its external surface area. Therefore, the catalytic activity rises when the particle size of the catalyst is reduced but at the same time the pressure loss rises because the gas mass velocity is high. For this reason, a cylindrical shape catalyst is widely used.

(2) Carrying Catalyst Metal (Ru)

The molded magnesium oxide can be made to carry ruthenium (Ru) on its external surface by impregnating the formed carrier with an aqueous solution containing ruthenium salt and subsequently drying and calcining it.

Methods that can suitably be used for impregnating the formed carrier with an aqueous solution containing ruthenium salt include an immersion method and a spray method, of which the spray method of atomizing an aqueous solution containing ruthenium salt and spraying it toward the carrier may preferably be used for the purpose of the present invention. Ruthenium chloride or ruthenium nitrate may suitably be used as ruthenium salt.

The carrier that adsorbed Ru is then dried at temperature between 50 and 150° C. for one to four hours and subsequently calcined at temperature between 300 and 500°, preferably between 350 and 450° C., for one to four hours. The atmosphere of the drying and the calcining may be air. The reaction activity of the catalyst metal is boosted further by the calcining.

B2. Synthesis Gas Production

Synthesis gas that contains CO and H$_2$ is produced as a result of reforming with H$_2$O and/or CO$_2$ that is conducted in the presence of the synthesis gas production catalyst prepared in the above-described manner by using mixture gas containing natural gas (hydrocarbons having 1 to 6 carbon atoms and generally containing methane as main component), steam and/or carbon dioxide supplied from line 25 and residual gas (off gas) isolated in the hydrogen separation step 90 and recycled by way of line 95.

The residual gas 95 mainly contains methane and carbon dioxide as well as hydrogen that is left unisolated.

Assume here that methane is main component of the supplied material.

(a) When methane (CH$_4$) is made to react with carbon dioxide (CO$_2$) (CO$_2$ reforming), the reaction that proceeds is expressed by formula (1) shown below.

$$CH_4 + CO_2 . 2CO + 2H_2 \tag{1}$$

(b) When methane (CH$_4$) is made to react with steam (H$_2$O) (steam reforming), the reaction that proceeds is expressed by formula (2) shown below.

$$CH_4 + H_2O . CO + 3H_2 \tag{2}$$

(c) Under the conditions of reforming reaction, a water gas shift reaction that is expressed by formula (3) shown below proceeds simultaneously with the reactions of the formulas (1) and (2) shown above because the catalyst has a shift ability.

$$CO + H_2O . CO_2 + H_2 \tag{3}$$

From the formulas (1) and (2) shown above, stoichiometrically, synthesis gas showing an H$_2$/CO mol ratio=1 and synthesis gas showing an H$_2$/CO mol ratio=3 are produced respectively in the CO$_2$ reforming of methane and in the steam reforming of methane. Thus, it is now possible to directly produce synthesis gas showing an H$_2$/CO mol ratio=2 that is suited for FT synthesis by combining these reactions without requiring gas separation of isolating hydrogen from generated gas.

However, under the reaction conditions for directly producing synthesis gas with such a mol ratio, generated gas generally shows a composition that is apt to deposit carbon on the surface of the catalyst to deactivate the catalyst due to the carbon deposit. Therefore, a catalyst for producing synthesis gas as described above is employed as catalyst that can dissolve this problem.

C. Carbon Dioxide Removal Step 40

This is a step of removing carbon dioxide gas from synthesis gas. For example, an operation of removing carbon dioxide gas by means of a liquid absorbent such as amine and subsequently stripping carbon dioxide gas from the liquid absorbent that contains carbon dioxide gas to regenerate the liquid absorbent is conducted. However, the carbon dioxide removal step 40 is not indispensable and may not necessarily be provided.

D. Fischer-Tropsch Oil Production Step (FT Synthesis Step) 50

Synthesis gas as described above is subjected to a Fischer-Tropsch reaction and the gaseous product is isolated from the reaction product to produce Fischer-Tropsch oil.

A Fischer-Tropsch synthesis reaction is a reaction for producing a mixture of hydrocarbons from CO and $H_2$ of synthesis gas by means of formula shown below.

$$CO + 2H_2 \rightarrow 1/n\text{-}(CH_2)_n\text{-} + H_2O$$

Catalyst metals that can be used for the above reaction include iron (Fe), cobalt (Co), ruthenium (Ru) and nickel (Ni) in the state of metal. If desired, such a catalytic metal may be supported on a carrier such as silica, alumina, silica-alumina or titania.

The reaction conditions generally include: reaction temperature: 200 to 350° C. and reaction pressure: atmospheric pressure to about 4.0 MPaG. When an iron catalyst is employed, the reaction conditions preferably include: reaction temperature: 250 to 350° C. and reaction pressure: about 2.0 to 4.0 MPaG. When a cobalt catalyst is employed, the reaction conditions preferably include: reaction temperature 220 to 250° C. and reaction pressure: about 0.5 to 4.0 MPaG.

The reaction is a sort of polymerization reaction. Generally, it is difficult to keep the degree of polymerization (n) to a constant level and the reaction product broadly spreads over a range of $C_1$ to $C_{100+}$. Then, the distribution of the number of carbon atoms of hydrocarbons produced conforms to the Schulz-Flory distribution law and can be expressed by the chain growth probability • of the distribution law. In the case of an industrial catalyst, • has a value between about 0.85 and 0.95.

The FT reaction primarily produces •-olefin which undergo the following secondary reactions. Namely, the secondary reactions include hydrogenation resulting in the formation of straight chain paraffins, hydrocracking resulting in the formation of lower paraffin such as methane, or secondary chain growth reactions resulting in the formation of higher hydrocarbons. Alcohols such as ethanol, ketones such as acetone and carboxylic acids such as acetic acid are produced as by-products only by small quantities.

Reactors that can be used for the FT synthesis reaction include fixed bed reactors, fluidized bed reactors, slurry bed reactors and supercritical reactors.

Since a refining process such as a dust elimination process and a desulfurization for protecting the catalyst are executed at the stage of producing synthesis gas that is used as raw material for FT synthesis, the obtained hydrocarbons contain neither sulfur nor heavy metals and hence are very clean.

The hydrocarbons produced by means of FT synthesis are mostly composed of straight chain olefins (1-olefin) and straight chain paraffins.

The separation means that can be used for isolating the gaseous product from the Fischer-Tropsch reaction product to produce Fischer-Tropsch oil (hydrocarbon oil) is not subjected to any particular limitations and may be selected from various known separation means. For example, a flash separator may be used.

E. Upgrading Reaction Step 60

The Fischer-Tropsch oil obtained from the Fischer-Tropsch oil production step 50 is then subjected to hydrogenation (catalytic hydrogenation).

The hydrogenation can be executed by using an arbitrarily selected catalyst bed reactor, which may be of the fluidized bed type, the moving bed type or the fixed bed type. The hydrogenation conditions typically include: reaction temperature: about 175 to 400° C. and hydrogen partial pressure: 1 to 25 MPaG (10 to 250 atm).

The high-purity hydrogen produced from the hydrogen separation step 90 (as supplied by way of lines 92, 97 and 87) and the hydrogen isolated in the upgrading gas-liquid separation step 70 (as supplied by way of lines 72, 77 and 87) are employed for the hydrogenation process. Note that line 97 and line 77 join each other to become line 87 for supplying hydrogen to the upgrading reaction step 60.

F. Upgrading Gas-Liquid Separation Step 70

The product hydrocarbons 71 such as naphtha, kerosene and gas oil and the gaseous substances containing hydrogen as main component are separated from each other in the upgrading gas-liquid separation step 70. As described above, the gaseous substances containing hydrogen as main component is circulated to and used in the upgrading reaction step 60 by way of lines 72, 77 and 87 and the gaseous substances are partly discharged from line 73 as off gas.

G. Shift Step 80

The synthesis gas produced from the synthesis gas production step 30 and passed through the carbon dioxide removal step 40 is partly branched from the main line so as to get into branch line 45 at a stage before entering the Fischer-Tropsch oil production step 50. The main line after the branching is indicated by reference symbol 47 in FIG. 1.

As shown in FIG. 1, the shift step 80 is assigned to the branch line 45. The hydrogen concentration of the synthesis gas passing through the branch line 45 is raised as a result of a water gas shift reaction of the shift step 80. More specifically, CO which is a component of the synthesis gas reacts with steam as seen from the reaction formula shown below (water gas shift reaction) to produce $H_2$ and $CO_2$ so that consequently the hydrogen concentration is raised.

$$CO + H_2O \rightarrow CO_2 + H_2$$

The rate at which synthesis gas is supplied to the branch line 45 is determined according to the rate of supply of hydrogen required in the upgrading reaction step 60 and the hydrodesulfurization step 20.

H. Hydrogen Separation Step 90

High-purity hydrogen 92 is produced in the hydrogen separation step 90 from the outlet gas supplied from the shift step 80 that is the immediately preceding step by way of line 81 and the residual gas 95 that is also produced is isolated. As pointed out above, the residual gas 95 contains methane and carbon dioxide as main components as well as hydrogen that is left unisolated.

The residual gas 95 is recycled to the synthesis gas production step 30 by way of line 95. The high-purity hydrogen is taken out by way of line 92 and supplied to the upgrading reaction step 60 and the hydrodesulfurization step 20.

A hydrogen pressure swing adsorption (PSA) apparatus is preferably employed for the hydrogen separation step 90. A hydrogen PSA apparatus contains adsorbents (zeolite-based adsorbents, active carbon, alumina, silica gel, etc.) in a plurality of adsorption towers that are arranged in parallel and is adapted to isolate high-purity hydrogen gas (e.g., not less than 98%) from synthesis gas by sequentially and repetitively executing steps of pressurizing, adsorbing, desorbing (depressurizing) and purging hydrogen in each adsorption tower. However, the hydrogen separation step 90 is not limited to the use of the above-described hydrogen PSA process and a hydrogen occlusion alloy absorption process, a membrane separation process or a combination of any of them may alternatively be employed.

Now, the present invention will be described in greater detail below by way of examples.

EXAMPLE 1

Synthesis gas of $H_2O/CO=2.0$ that is suitable for FT (Fischer-Tropsch) synthesis of liquid hydrocarbons was produced from natural gas by way of the steps shown in FIG. 1.

A catalyst having Ru supported on an MgO carrier was used as synthesis gas production catalyst.

The reaction conditions of the synthesis gas production step 30 included: catalyst bed outlet temperature: 900° C., catalyst bed outlet pressure: 2.0 MPaG, GHSV of 2000 hr$^{-1}$, $H_2O/C=0.92$ and $C_2O/C=0.40$ (where $H_2O$ and $CO_2$ represent the number of $H_2O$ molecules and the number of $CO_2$ molecules respectively and C represents the number of carbon atoms in hydrocarbons originating from hydrocarbons supplied as raw material). The composition of the natural gas was C1/C2/C3/C4/C5/C6+/$CO_2$/$N_2$=64.0/2.9/1.7/0.9/0.3/0.1/30.0/0.1 (molar ratio).

The material balance was determined and secured from the inlet of the synthesis gas production step to the outlet of the upgrading reaction step shown in FIG. 1 and the synthesis gas production step in the process of producing liquid hydrocarbons from natural gas was evaluated on the basis of the material balance. The material balance was computationally determined on the basis of the compositions observed at the spots indicated by reference symbols (1) through (13) in FIG. 1.

Figure 2:
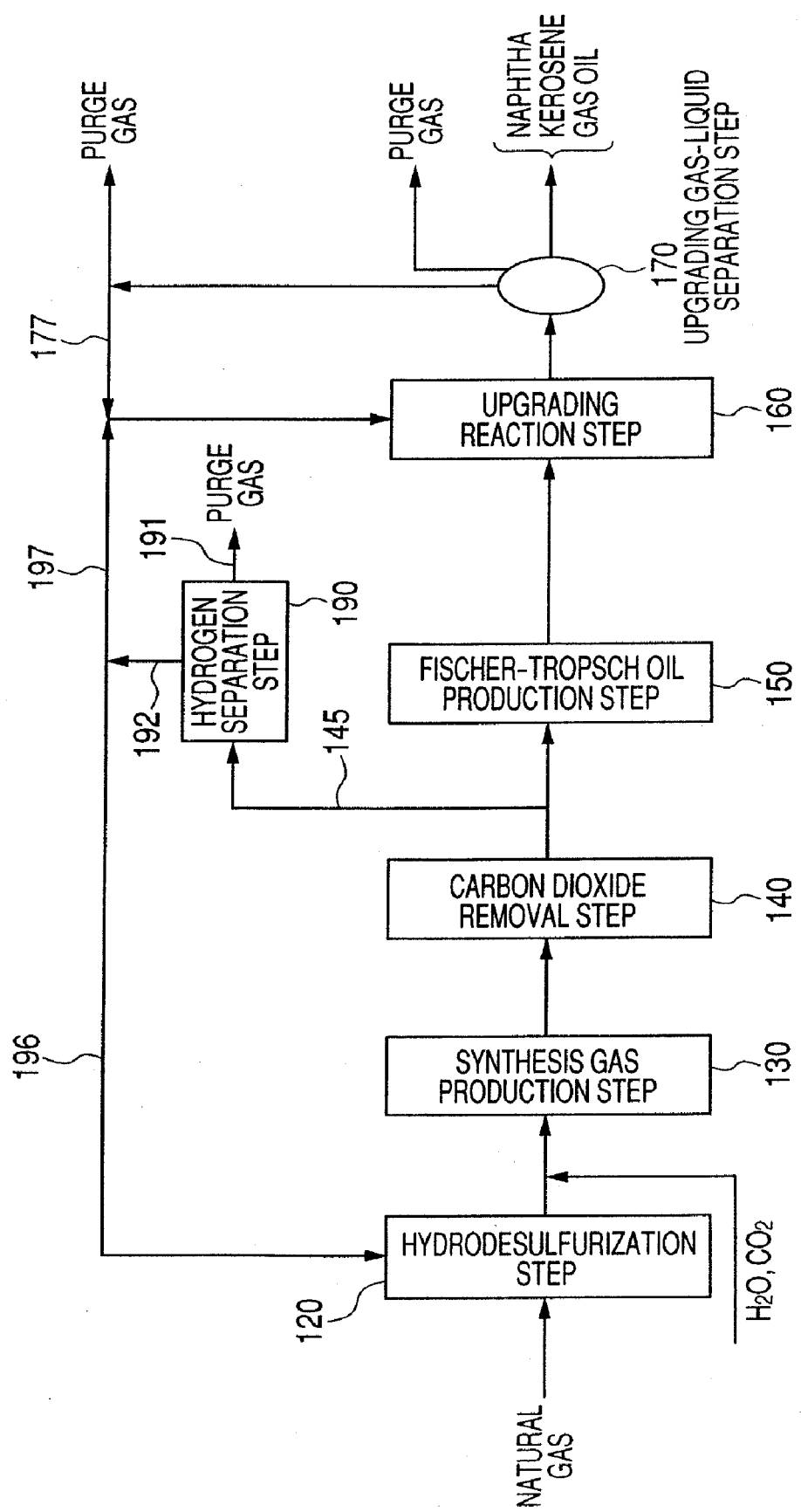
FIG. 2 is a flowchart of the process of producing liquid hydrocarbons from natural gas according to the prior art.

As a result, while the ratio by which the carbon atoms of the hydrocarbons contained in the natural gas serve in the obtained liquid hydrocarbons products (kerosene, gas oil, naphtha) was 60.8% for the conventional process shown in FIG. 2, where residual gas is not recycled, it was raised to 64.8% for the process according to the present invention that is provided with a system for recycling residual gas. Additionally, according to the present invention, the rate of supply of natural gas was reduced by 6.2% from the rate of supply of the conventional process shown in FIG. 2.

In other words, with the process according to the present invention that recycles residual gas, the raw material consumption per product was improved by 6.6% (100×(1/0.938−1)%) from the conventional process shown in FIG. 2. The residual gas mainly contained methane and carbon dioxide, of which methane contributed to the improvement of the raw material consumption per product by 0.9% (contribution ratio of 13%) and carbon dioxide contributed to the improvement of the raw material consumption per product by 5.7% (contribution ratio of 87%).

As described above, according to the present invention, the synthesis gas produced from the synthesis gas production step is partly branched off at a stage prior to getting to the Fischer-Tropsch oil production step to form a branch line. Then, a shift step is arranged before the branch line gets to the hydrogen separation step in order to raise the hydrogen concentration by subjecting the synthesis gas entering the branch line to a water gas shift reaction. Thereafter, the residual gas (off gas) isolated in the hydrogen separation step that is arranged after the shift step is circulated to the synthesis gas production step as raw material for synthesis gas production. Thus, the off gas produced from the hydrogen separation step that is conventionally consumed as fuel is taken into the process again and reutilized as raw material to achieve a significant improvement in terms of raw material consumption per product.

Additionally, the synthesis gas that is branched off is introduced into the hydrogen separation step after being subjected to a shift reaction so that the hydrogen purity of the gas introduced into the hydrogen separation step is improved by about 10% if compared with the conventional process. Thus, the load of the hydrogen separation step is reduced and, at the same time, the carbon dioxide that is produced with an increased quantity can be reutilized as reforming material to consequently raise the yield of producing liquid hydrocarbon products.

INDUSTRIAL APPLICABILITY

Thus, according to the present invention, natural gas can be chemically converted and utilized for gas to liquids (GTL) processes for producing liquid hydrocarbons.

This application claims the benefit of Japanese Patent Application No. 2008-065465, filed Mar. 14, 2008, which is hereby incorporated by reference herein in its entirety.

The invention claimed is:

1. A production method of liquid hydrocarbons from natural gas, comprising:
   a hydrodesulfurization step of removing sulfur compounds in natural gas by hydrodesulfurization;
   a synthesis gas production step of producing synthesis gas by way of a reforming reaction of the natural gas after hydrodesulfurization with steam and/or carbon dioxide;
   a Fischer-Tropsch oil production step of producing Fischer-Tropsch oil from the synthesis gas by subjecting the synthesis gas produced from the synthesis gas production step to a Fischer-Tropsch reaction;
   an upgrading reaction step of hydrogenating the Fischer-Tropsch oil produced from the Fischer-Tropsch oil production step;
   an upgrading gas/liquid separation step of subjecting the hydrogenated product obtained by the upgrading reaction step to gas/liquid separation to obtain liquid hydrocarbons;
   a shift step of partly branching the synthesis gas produced from the synthesis gas production step to form a branch line at a stage prior to getting to the Fischer-Tropsch oil production step and raising the hydrogen concentration by subjecting the synthesis gas into the branch line to a water gas shift reaction; and
   a hydrogen separation step of separating the high-purity hydrogen from the outlet gas of the shift step and also isolating the consequently produced residual gas,
   wherein the residual gas separated in the hydrogen separation step is circulated to the synthesis gas production step in order to use it as raw material for synthesis gas production.

2. The method according to claim 1, wherein the residual gas separated in the hydrogen separation step contains methane and carbon dioxide as main components.

3. The method according to claim 1, wherein the high-purity hydrogen gas separated in the hydrogen separation step is supplied to the hydrodesulfurization step and the upgrading reaction step.

4. The method according to claim 2, wherein the high-purity hydrogen gas separated in the hydrogen separation step is supplied to the hydrodesulfurization step and the upgrading reaction step.

5. The method according to claim 1, wherein steam and/or carbon dioxide are added at a ratio of $H_2O/C=0.0$ to 3.0 and/or at a ratio of $CO_2/C=0.0$ to 1.0, where $H_2O$ and $CO_2$ represent the number of $H_2O$ molecules and the number of $CO_2$ molecules respectively and C represents the number of carbon atoms in hydrocarbons originating from the mixture material of natural gas and hydrocarbons being circulated for use.

6. The method according to claim 2, wherein steam and/or carbon dioxide are added at a ratio of $H_2O/C=0.0$ to 3.0 and/or at a ratio of $CO_2/C=0.0$ to 1.0, where $H_2O$ and $CO_2$ represent the number of $H_2O$ molecules and the number of $CO_2$ molecules respectively and C represents the number of carbon atoms in hydrocarbons originating from the mixture material of natural gas and hydrocarbons being circulated for use.

7. The method according to claim 1, wherein the outlet temperature and the outlet pressure of the catalyst bed are respectively 800 to 950° C. and 1.5 to 3.0 MPaG and the gas hourly space velocity (GHSV) is 500 to 5,000 hr$^{-1}$, in the synthesis gas production step.

8. The method according to claim 2, wherein the outlet temperature and the outlet pressure of the catalyst bed are respectively 800 to 950° C. and 1.5 to 3.0 MPaG and the gas hourly space velocity (GHSV) is 500 to 5,000 hr$^{-1}$, in the synthesis gas production step.

9. The method according to claim 1, wherein the natural gas supplied as raw material contains hydrocarbons having 1 to 6 carbon atoms, which include methane as a main component, in the synthesis gas production step.

10. The method according to claim 2, wherein the natural gas supplied as raw material contains hydrocarbons having 1 to 6 carbon atoms, which include methane as a main component, in the synthesis gas production step.

* * * * *